United States Patent [19]

Shah

[11] 4,369,229

[45] Jan. 18, 1983

[54] COMPOSITE HYDROGEL-FORMING ARTICLE AND METHOD OF MAKING SAME

[75] Inventor: Kishore R. Shah, Chelmsford, Mass.

[73] Assignee: The Kendall Company, Boston, Mass.

[21] Appl. No.: 229,653

[22] Filed: Jan. 29, 1981

[51] Int. Cl.³ ............................................. B32B 27/00
[52] U.S. Cl. ................................ 428/421; 156/307.1; 351/160 R; 427/164; 428/412; 428/508; 428/515; 428/520
[58] Field of Search ............... 428/412, 421, 515, 520, 428/508; 525/205

[56] References Cited

U.S. PATENT DOCUMENTS

| | | | |
|---|---|---|---|
| 3,027,347 | 3/1962 | FiKentscher et al. | 525/205 |
| 3,511,659 | 5/1970 | Dennis, Jr. et al. | 430/227 |
| 3,723,171 | 3/1973 | Fucks | 428/421 |
| 3,928,262 | 12/1975 | Ono et al. | 525/205 |
| 3,953,660 | 4/1976 | Ishida | 428/520 |
| 3,983,276 | 9/1976 | Matsumoto | 428/412 |
| 4,233,367 | 11/1980 | Ticknor et al. | 428/515 |

OTHER PUBLICATIONS

Hoffman et al., Am. Chem. Soc. Div. of Polym. Chem. Preprints, vol. 13(2), 723–728, (1972).

Primary Examiner—J. Ziegler

[57] ABSTRACT

Polymer blends capable of forming hydrogels upon immersion in water are bonded by heat and pressure alone to water-resistant polymer compositions compatible with vinyl lactam polymers to form laminates. Bonding can also be achieved by casting on the surface of the polymer composition a solution of the blend in a solvent inert to the polymer composition and evaporating the solvent. The blends are optically clear blends of vinyl lactam polymers or copolymers with water insoluble copolymers of a hydrophobic water-insoluble ethylenically unsaturated monomer, an ethylenically unsaturated monomer containing an acid group, and optionally a hydrophilic ethylenically unsaturated monomer free from acidic groups.

5 Claims, No Drawings

COMPOSITE HYDROGEL-FORMING ARTICLE AND METHOD OF MAKING SAME

This invention relates to laminated polymeric products in which one layer of the product is a polymeric blend capable of absorbing a large amount of water to form a hydrogel without dissolution at room temperature, and the other layer adherent to the first, is a tough plastic or polymeric composition which is substantially inert to or resistant to water; and to a method of making such products by plying up a layer of blend with a layer of plastic and subjecting them to heat and pressure.

In the manufacture of articles which come into contact with body tissues and fluids, such as prostheses, catheters, implants, oxygenator membranes, artificial kidney membranes, shunts and tubing, it is important that the surface of the article be one which is stable and which has no adverse effect upon the tissue or fluid with which it comes into contact. Polymer compositions which absorb large amounts of water to form hydrogels without dissolution at room temperature possess desirable properties for contact with body tissues and fluids but have very low strength when swollen to hydrogel form and thus, in the case of most articles, reinforcement of some sort is required to provide adequate strength.

It has been proposed to laminate hydrogel-forming polymeric compositions with other water-resistant plastics or polymer compositions having the desired strength, but it has been difficult to obtain adequate adhesion between layers of the laminate, particularly after hydration. In Dennis et al., U.S. Pat. No. 3,511,659, this lack of adhesion is made use of to provide a moisture-releasable laminated photographic film. Hoffman et al. in Am. Chem. Soc., Div. of Polym. Chem., Preprints Vol. 13(2), pages 723-728 (1927) have described the use of gammaradiation to induce covalent bonding or grafting of a thin layer of certain hydrogel-forming polymer to water-resistant polymeric substrates such as polyurethane, and others have proposed similar grafting of hydrogel-forming polymers to polymeric substrates by means of atomic hydrogen vapors, microwave exposure, and chemical treatment.

It has now been found that heat and pressure alone suffice to bond together a layer of certain hydrogel-forming polymeric compositions with a layer of certain solid high molecular weight water-resistant polymeric materials to form a composite or laminated product in which the layers remain adherent to each other even after the hydrogel-forming polymeric composition has absorbed more than 45% of its weight of water. By "water-resistant polymeric materials" is meant those which retain at least 90% of their tensile strength and swell no more than 10% in volume upon immersion in water at room temperature. Equally satisfactory composite or laminated products having the same properties can be made by casting on the surface of the solid water-resistant polymeric material a solution of the hydrogel-forming polymeric composition in a volatile solvent which is inert to, i.e., which does not dissolve or swell appreciably the water-resistant polymeric material, and evaporating the solvent at a temperature below the softening point of the water-resistant polymeric material.

The invention comprises a composite article comprising (A) a layer of an optically clear blend of (1) 40 to 98% by weight, based on the total weight of the blend, of a water-soluble polymer of a vinyl lactam having the structure

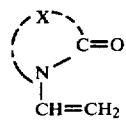

in which X represents an alkylene bridge having three to five carbon atoms, or a water-soluble copolymer thereof, with 1 to 90 mole percent of copolymerizable monomer containing a polymerizable ethylenic unsaturation, said polymer or copolymer having a molecular weight from 10,000 to 1,000,000 and (2) 2 to 60% by weight of a water-insoluble copolymer consisting essentially of 50 to 90% by weight, based on the total weight of the copolymer, of a hydrophobic water-insoluble ethylenically unsaturated monomer, 2 to 12% by weight of an ethylenically unsaturated monomer containing an acid group, and 0 to 50% by weight of a hydrophilic ethylenically unsaturated monomer free from acidic groups, and (B) adherent thereto a layer of solid high molecular weight water-resistant polymeric material which is compatible with said vinyl lactam polymer or copolymer as determined by optical clarity of a mixture in the unhydrated state of said polymeric material with said vinyl lactam polymer or copolymer, said layers being in face to face adherent contact with each other, and said layer (A) being capable of absorbing more than 45% of its weight of water without dissolution at room temperature to form a hydrogel adherent to layer (B).

The invention also comprises the method of making a composite article which comprises placing in contact with each other (A) a layer of an optically clear blend of (1) 40 to 98% by weight, based on the total weight of the blend, of a water-soluble polymer of a vinyl lactam having the structure

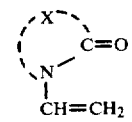

in which X represents an alkylene bridge having three to five carbon atoms, or a water-soluble copolymer thereof with 1 to 90 mole percent of copolymerizable monomer containing a polymerizable ethylenic unsaturation, said polymer or copolymer having a molecular weight from 10,000 to 1,000,000 and (2) 2 to 60% by weight of a water-insoluble copolymer consisting essentially of 50 to 90% by weight, based on the total weight of the copolymer, of a hydrophobic water-insoluble ethylenically unsaturated monomer, 2 to 12% by weight of an ethylenically unsaturated monomer containing an acid group, and 0 to 50% by weight of a hydrophilic ethylenically unsaturated monomer free from acidic groups, and (B) a layer of solid high molecular weight water-resistant polymeric material which is compatible with said vinyl lactam polymer or copolymer as determined by optical clarity of a mixture in the unhydrated state of said polymeric material with said vinyl lactam polymer or copolymer and subjecting said layers to heat and pressure to adhere them together to form a composite article in which said layer (A) is capable of absorbing more than 45% of its weight of water without dissolution at room temperature to form a hydrogel adherent to layer (B).

The invention also comprises the method of making a composite article which comprises dissolving in a volatile solvent an optically clear blend of (1) 40 to 98% by weight, based on the total weight of the blend, of a water-soluble polymer of a vinyl lactam having the structure

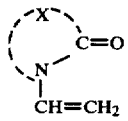

in which X represents an alkylene bridge having three to five carbon atoms, or a water-soluble copolymer thereof with 1 to 90 mole percent of copolymerizable monomer containing a polymerizable ethylenic unsaturation, said polymer or copolymer having a molecular weight from 10,000 to 1,000,000 and (2) 2 to 60% by weight of a water-insoluble copolymer consisting essentially of 50 to 90% by weight, based on the total weight of the copolymer, of a hydrophobic water-insoluble ethylenically unsaturated monomer, 2 to 12% by weight of an ethylenically unsaturated monomer containing an acid group, and 0 to 50% by weight of a hydrophilic ethylenically unsaturated monomer free from acidic groups, depositing a layer of the solution on a layer of solid high molecular weight water-resistant polymeric material which is compatible with said vinyl lactam polymer or copolymer as determined by optical clarity of a mixture in the unhydrated state of said polymeric material with said vinyl lactam polymer or copolymer, the solvent being one which is inert to, i.e., which does not dissolve or swell appreciably the water-resistant polymeric material, and evaporating the solvent at a temperature below the softening point of the water resistant polymeric material to form a composite article in which the solvent-free layer deposited from solution is adherent to the layer of water-resistant polymeric material and is capable of absorbing more than 45% of its weight of water without dissolution at room temperature to form a hydrogel adherent to the last said layer.

The hydrogel-forming polymeric compositions useful in the present invention are described in my copending application Ser. No. 201,349 filed Oct. 27, 1980, now U.S. Pat. No. 4,300,820, granted Nov. 17, 1981 the specification of which is incorporated herein by reference.

The N-vinyl lactams, polymers and copolymers of which can be used in the present invention include those having the structure

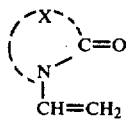

in which X represents an alkylene bridge having three to five carbon atoms, such as 1-vinyl-2-pyrrolidone, 1-vinyl-5-methyl-2-pyrrolidone, 1-vinyl-2-piperidone, and N-vinyl-ξ-caprolactam. The copolymerizable monomers with which the N-vinyl lactams can be copolymerized to form copolymers containing 10 to 99, preferably 25 to 99, mole percent N-vinyl lactam and correspondingly 1 to 90, preferably 1 to 75, mole percent of comonomer, include N,N-dimethyl acrylamide, glyceryl methacrylate, diethylene or triethylene glycol monomethacrylate or other hydrophilic monomers, as well as vinyl acetate, alkyl acrylate or methacrylate, vinyl alkyl ethers, acrylonitrile, vinyl chloride, or other hydrophobic monomers. In the case of monomers such as vinyl acetate which themselves form water-insoluble homopolymers, the upper limit of the amount of such monomer which can be employed to form the desired water-soluble copolymer is much lower than in the case of monomers such as N,N-dimethyl acrylamide which form water-soluble homopolymers. These polymers and copolymers may have molecular weights from 10,000 to 1,000,000 or more, but those having molecular weights from 100,000 to 1,000,000 are preferred. Polymers and copolymers of 1-vinyl-2-pyrrolidone are preferred.

The copolymers which can be employed in hydrogel-forming polymeric blends with the vinyl lactam polymer or copolymer in the present invention include water-insoluble copolymers of a hydrophobic water-insoluble ethylenically unsaturated monomer such as alkyl esters of acrylic or methacrylic acid in which the alkyl group has from 1 to 16 carbon atoms, styrene, acrylonitrile, vinyl acetate, vinyl butyrate, vinyl chloride, vinylidene chloride, ethylene, propylene, butylene, butadiene and other polymerizable alkadienes, vinyl alkyl ethers and vinyl alkyl ketones in which the alkyls have 3 or more carbon atoms, and the like. The water-insoluble copolymers also include as another essential monomer an ethylenically unsaturated monomer containing an acid group such as a carboxylic, sulfonic, or phosphonic acid group; among suitable acidic monomers are acrylic acid, methacrylic acid, crotonic acid, maleic acid, 2-sulfoethyl methacrylate, 1-phenyl vinyl phosphonic acid, and the like. The third monomer in the water-insoluble copolymer is selected from a group of hydrophilic ethylenically unsaturated monomers, possessing a solubility parameter in excess of 11 $[calories/cm^3]^{\frac{1}{2}}$, and free from acidic groups, such as methacrylamide, acrylamide, hydroxyethyl methacrylate, glyceryl methacrylate, etc.

In the case of each of the three types of monomers a mixture of two or more individual monomers of the same type can be used.

Compatibility or incompatibility of the water-insoluble copolymer with the water-soluble vinyl lactam polymer or copolymer in the hydrated form of the blend, that is, the suitability of the water-insoluble copolymer for use in the present invention, can in each case be readily determined by visual examination of a blend of the two polymers after equilibration in water at room temperature. If the blend is transparent and optically clear and remains so after immersion in water at 20° C. without dissolution in the water, it forms a satisfactory hydrogel. If the blend is cloudy or opaque after equilibration in water, or if it dissolves in water at 20° C., the blend made from that copolymer is not satisfactory and possesses poor mechanical properties. For a blend composition to possess satisfactory mechanical properties in the hydrated form, the size of the microphase domains of the water-insoluble copolymer in the hydrogel should not be greater than 4,000 Å, and preferably should be below about 1000 Å.

Compatibility of the solid high molecular weight water-resistant polymeric material with the vinyl lactam polymer or copolymer for use in the present invention can be determined by visual examination of a blend of the two polymers in the unhydrated state, without equilibration in water. If the blend is transparent and optically clear, the water-resistant polymeric material is compatible. Although certain polymeric materials, e.g., a copolymer of 62% n-butyl methacrylate, 30% methacrylamide, and 8% acrylic acid, are compatible with poly(vinyl pyrollidone) in both the hydrated and the unhydrated state, others such as poly (vinylidene fluoride) are compatible with poly(vinyl pyrollidone) only in the unhydrated state by the foregoing test.

The relative proportions of the different monomers in the water-insoluble copolymer may vary widely; the hydrophobic water-insoluble ethylenically unsaturated monomer may amount to 50% to 90% by weight, based on the total weight of copolymer, while the ethylenically unsaturated monomer containing an acidic group may amount to 2% to 12% by weight; the hydrophilic ethylenically unsaturated monomer may amount to 0 to 50% by weight. The exact proportions of the three types of monomers are determined by the hydrophobic-hydrophilic balance required in each case. In many cases, for attainment of this balance the incorporation of 15 to 45% of a hydrophilic monomer is required.

Thus, in the case of one preferred class of copolymers, the amount of methyl methacrylate (or styrene or 2-ethylhexyl acrylate) is from 55 to 70% by weight based on the total copolymer weight, the amount of acrylic acid is from 2 to 12% by weight, and the amount of methacrylamide is from 25–43% by weight.

In the case of another preferred copolymer, the amount of n-butyl methacrylate is from 55 to 80% by weight based on the total copolymer weight, the amount of acrylic acid is from 2 to 12% by weight, and the amount of methacrylamide is from 15 to 35% by weight.

In the case of still another preferred copolymer, the amount of methyl methacrylate is from 88 to 90% by weight of the total copolymer, while 2-acrylamido-2-methyl propanesulfonic acid, the only other monomer constituent, is from 10–12% by weight. In this case, the presence of a non-acidic hydrophilic comonomer is not essential.

In the case of still another preferred copolymer, the amount of n-butyl methacrylate is from 50–78% by weight of the total copolymer, the amount of acrylic acid is from 2 to 12% by weight, and the amount of hydrophilic p-styrene sulfonamide is from 20 to 35% by weight.

In the case of yet another preferred copolymer, the amount of n-butyl methacrylate is from 55 to 70% of the total copolymer weight, acrylic acid is from 2 to 12%, and hydroxyethyl methacrylate is from 25 to 43%.

The relative proportions of water-soluble vinyl lactam polymer or copolymer and of water-insoluble copolymer in the blend vary over a wide range, from 40 to 98% by weight, preferably from 50 to 98%, based on the total weight of the blend, of the former and from 2 to 60% by weight, preferably from 2 to 50%, of the latter; optimum proportions of each within the range vary depending upon the particular properties desired in the blend as well as upon the identity of the particular polymers and copolymers present in the blend. The greater the proportion of the water-insoluble copolymer in the blend, the lower is the equilibrium water content of the resultant hydrogel. The water content of the blend hydrogels of this invention can be varied from approximately 30% to 95% or higher by judicious selection of the components and their proportion in the blend. In general, the higher the water content of the hydrogel, the poorer become its mechanical properties.

The blend can be made by mixing together solutions or dispersions of the water-soluble vinyl lactam polymer or copolymer and of the water-insoluble copolymer in any desired vehicles or solvents which are miscible with each other, then removing the vehicle or solvent, as by evaporation. It may also be possible to blend the polymer and/or copolymers on a hot roll mill or in an extruder or in other conventional mixing equipment.

The solid high molecular weight water-resistant polymeric materials which can be employed as the strength-giving layers or components in the products of the present invention may be plastic or elastomeric and include a wide variety of polymers such as polyvinyl butyral, polyvinyl formal, cellulose acetate, cellulose acetate propionate, cellulose acetate butyrate, ethyl cellulose, copolymer of vinyl chloride with vinyl acetate, polyvinyl chloride, and polyvinylidene fluoride. Compatibility of the water-resistant polymeric material with a vinyl lactam polymer or copolymer in the unhydrated state can be determined by the compatibility test described above. All of the foregoing polymers are compatible with poly(vinyl pyrollidone) in the unhydrated state but not in the hydrated state.

Films or sheets of these hydrogel-forming blends are bonded by heat and pressure to, or by casting a film from solution on, one or both surfaces of films, sheets, or other shaped objects of the solid high molecular weight water-resistant polymeric materials which are compatible with the vinyl lactam polymer or copolymer as determined by the aforesaid compatibility test to form composite or laminated articles. Composite or laminated articles can also be formed having two or more layers of water-resistant polymeric materials bonded to each other with one or more outer layers of hydrogel-forming blend adherent thereto.

The temperature and pressure required for bonding varies depending upon the precise identity of the polymeric composition in each of the layers being bonded but in general is approximately the same as that required for molding or shaping each of the layers. The minimum time required for adequate bonding also varies considerably, shorter times generally being required as the temperature and pressure are increased. In the case of casting a layer of the hydrogel-forming blend from solution, the solvent is preferably evaporated from the solution at a temperature below the softening point of the solid water-resistant polymeric material, e.g., room temperature or higher.

The thickness of each layer of the laminated polymeric product may vary over a wide range depending upon the characteristics desired in the finished product. In general, the layer of hydrogel-forming polymeric blend material is relatively thin, of the order of 0.1 to 20 mils, because it provides surface properties and compatibility with body tissues and fluids, while the strength-giving water-resistant polymeric material is generally thicker than the first and may be many times as thick as in the case of such products as oxygenator membranes, artificial kidney membranes, catheters, shunts or tubing, and contact lenses. In the case of each of these articles, the hydrogel-forming polymeric blend material is in the form of a relatively thin coating for the surface of the article which is to come into contact with the body tissue or fluid. A similarly thin layer of hydrogel-forming polymeric material bonded to a relatively thick layer of cellulose acetate butyrate provides a non-fogging surface for a window light.

In the case of a contact lens, a conventional hard contact lens made of a water-resistant polymeric material such as cellulose acetate butyrate can be laminated on opposite sides to a thin (0.5–2 mils) film of a hydrogel-forming blend in accordance with the present invention using a suitable heated pressure mold. The finished laminated contact lens having a core of water-resistant polymeric material laminated on opposite sides to layers of hydrogel-forming blend displays superior surface properties and produces less irritation than the conventional hard contact lens without the coating of hydrogel-forming blend.

The following examples are intended to illustrate more fully the nature of the invention without acting as a limitation upon its scope.

EXAMPLE 1

A sheet of commercially available water-resistant copolymer of ethylene with acrylic acid (92:8 by weight) 70 mils thick was placed in face to face contact with a film (4 mils thick) of an optically clear hydrogel-forming blend of 85% by weight of water-soluble poly(vinyl pyrrolidone) mol. wt. 360,000 and 15% by weight of a water insoluble copolymer of 65 parts by weight of methyl methacrylate, 5 parts of acrylic acid, and 30 parts of methacrylamide. The plied-up assemblage was then pressed between plates at 150° C. and light pressure (about 10 psi) for 1–2 minutes to form a laminate. When immersed in water, the layer of blend formed a water-swollen layer of hydrogel displaying excellent bonding to the sheet of ethylene-acrylic acid copolymer. The laminate displayed excellent tensile and tear strength, more than 90% of the corresponding strengths of the laminate before immersion in water.

EXAMPLES 2–12

The procedure of Example 1 was repeated with different hydrogel-forming blends and different water-resistant polymer sheets with generally similar results, as shown in the following Table.

TABLE

| | Hydrogel Blend | | | | | | | | | |
|---|---|---|---|---|---|---|---|---|---|---|
| | Water Soluble Polymer/ Copolymer Compositions[b] (Mole ratio) | | | Water Insoluble Copolymer Compositions[b] (Weight Ratio) | | | | Water Soluble Copolymer in Blend | Equi- librium Water Content[a] | Water Resistant |
| Example No. | VP | DMA | VA | BMA | MMA | MAA | HEMA | AA | (wt %) | (wt %) | Plastic[c] |
| 1 | 100 | — | — | — | 65 | 30 | — | 5 | 85 | 85 | Copolymer of 92% ethylene, 8% acrylic acid (Dow 449) |
| 2 | 30 | 70 | — | 62 | — | 30 | — | 8 | 70 | 67 | |
| 3 | 100 | — | — | — | 65 | 30 | — | 5 | 85 | 85 | PVDF (Kynar) |
| 4 | 30 | 70 | — | 62 | — | 30 | — | 8 | 70 | 67 | |
| 5 | 100 | — | — | — | 65 | 30 | — | 5 | 85 | 85 | CAB |
| 6 | 30 | 70 | — | 62 | — | 30 | — | 8 | 70 | 67 | CAB |
| 7 | 25 | 50 | 25 | 62 | — | 30 | — | 8 | 70 | 65 | CAB |
| 8 | 100 | — | — | 52 | — | — | 40 | 8 | 80 | 82 | CAB |
| 9 | 100 | — | — | — | 65 | 30 | — | 5 | 85 | 85 | PVC |
| 10 | 30 | 70 | — | 62 | — | 30 | — | 8 | 70 | 67 | PVC |
| 11 | 25 | 50 | 25 | 62 | — | 30 | — | 8 | 70 | 65 | PVC |
| 12 | 100 | — | — | 52 | — | — | 40 | 8 | 80 | 82 | PVC |

[a]Measurement made on unlaminated films.
[b]VP = N—Vinyl 2-Pyrrolidone
DMA = N,N—Dimethylacrylamide
VA = Vinyl Acetate
BMA = n-Butyl Methacrylate
MMA = Methyl Methacrylate
MAA = Methacrylamide
HEMA = 2-Hydroxyethyl Methacrylate
AA = Acrylic Acid
[c]PVDF = Poly(vinylidene fluoride)
CAB = Cellulose Acetate Butyrate
PVC = Poly(vinyl chloride)

EXAMPLE 13

There was dissolved in 70 parts by weight of diacetone alcohol 30 parts of a blend containing 80% by weight of poly(vinyl pyrrolidone) mol.wt. 360,000 and 20% of a copolymer of 62% butyl methacrylate, 30% methacrylamide, and 8% acrylic acid. The solution was cast as a liquid film on the surface of a 10 mil sheet of the same ethylene-acrylic acid copolymer as employed in Example 1. The sheet together with the cast liquid film was then dried for 30 minutes in a hot air oven at 80° C. to deposit a dry solid layer 2 mils thick bonded to the sheet of ethylene-acrylic acid copolymer. This laminated product also displayed good bond strength between its two layers and excellent tensile and tear strengths both before and after equilibration in water to provide a water-swollen layer of hydrogel.

What is claimed is:

1. A composite article comprising (A) a layer of an optically clear blend of (1) 40 to 98% by weight, based on the total weight of the blend, of a water-soluble polymer of a vinyl lactam having the structure

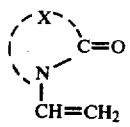

in which X represents an alkylene bridge having three to five carbon atoms, or a water-soluble copolymer thereof with 1 to 90 mole percent of copolymerizable monomer containing a polymerizable ethylenic unsaturation, said polymer or copolymer having a molecular weight from 10,000 to 1,000,000 and (2) 2 to 60% by weight of a water-insoluble copolymer consisting essentially of 50 to 90% by weight, based on the total weight of the copolymer, of a hydrophobic water-insoluble ethylenically unsaturated monomer, 2 to 12% by weight of an ethylenically unsaturated monomer containing an acid group, and 0 to 50% by weight of a hydrophilic ethylenically unsaturated monomer free from acidic groups, and (B) adherent thereto a layer of solid high molecular weight water-resistant polymeric material which is compatible with said vinyl lactam polymer or copolymer in the unhydrated state as determined by optical clarity of a mixture of said polymeric material with said vinyl lactam polymer or copolymer, said layers being in face to face adherent contact with each other, and said layer (A) being capable of absorbing more than 45% of its weight of water without dissolution at room temperature to form a hydrogel adherent to layer (B).

2. A composite article as claimed in claim 1 in which said water-resistant polymeric material is a copolymer of ethylene and acrylic acid.

3. A composite article as claimed in claim 1 in which said water-resistant polymeric material is poly(vinyl chloride).

4. A composite article as claimed in claim 1 in which said water-resistant polymeric material is poly(vinylidene fluoride).

5. A composite article as claimed in claim 1 in which said water-resistant polymeric material is cellulose acetate butyrate.

* * * * *